US009188900B2

(12) United States Patent
Iwamoto

(10) Patent No.: US 9,188,900 B2
(45) Date of Patent: Nov. 17, 2015

(54) LIGHT BEAM EMITTING APPARATUS, LIGHT SCANNING APPARATUS, AND IMAGE FORMING APPARATUS

(71) Applicant: CANON KABUSHIKI KAISHA, Tokyo (JP)

(72) Inventor: Kazuyuki Iwamoto, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/453,412

(22) Filed: Aug. 6, 2014

(65) Prior Publication Data
US 2015/0054901 A1 Feb. 26, 2015

(30) Foreign Application Priority Data

Aug. 23, 2013 (JP) ................................. 2013-173563

(51) Int. Cl.
*B41J 2/45* (2006.01)
*G03G 15/04* (2006.01)
*G02B 26/12* (2006.01)

(52) U.S. Cl.
CPC .............. *G03G 15/04* (2013.01); *G02B 26/123* (2013.01); *G03G 15/04072* (2013.01)

(58) Field of Classification Search
CPC ........ G02B 6/4214; G02B 6/43; G02B 6/138; H01L 224/48091; H01L 2924/00
USPC ................. 347/230, 233, 238, 241, 243, 245, 347/256–258, 263; 385/14, 33, 93
See application file for complete search history.

(56) References Cited

U.S. PATENT DOCUMENTS

| 7,321,380 | B2 | 1/2008 | Iwamoto | 347/244 |
| 7,446,794 | B2 | 11/2008 | Iwamoto | 347/241 |
| 7,471,307 | B2 | 12/2008 | Iwamoto | 347/234 |
| 7,518,627 | B2 | 4/2009 | Iwamoto | 347/238 |
| 8,169,457 | B2 * | 5/2012 | Kubo et al. | 347/242 |
| 2009/0195849 | A1 * | 8/2009 | Ichii et al. | 359/204.1 |
| 2013/0286141 | A1 | 10/2013 | Iwamoto | 347/224 |

FOREIGN PATENT DOCUMENTS

JP     2004-006592     1/2004

* cited by examiner

*Primary Examiner* — Hai C Pham
(74) *Attorney, Agent, or Firm* — Fitzpatrick, Cella, Harper & Scinto

(57) ABSTRACT

A light beam emitting apparatus including: a light source having plural light emitting points emitting beams; and a holding member configured to hold the source and having first, second, and third abutment portions, an emission direction of the beams being regulated by the abutment portions in abutment with the source, wherein as viewed along an optical path of the beams, an angle formed by a first line connecting two farthest light emitting points with a second line connecting the first and second abutment portions is smaller than angles formed by the first line with a third line connecting the second and third abutment portions and formed by the first line with a fourth line connecting the third and first abutment portions, and a distance between the first and second abutment portions is larger than distances between the second and third abutment portions and between the third and first abutment portions.

10 Claims, 7 Drawing Sheets

LIGHT BEAM EMITTING APPARATUS, LIGHT SCANNING APPARATUS, AND IMAGE FORMING APPARATUS

BACKGROUND OF THE INVENTION

1. Field of the Invention

The present invention relates to a light beam emitting apparatus including a plurality of light emitting points, a light scanning apparatus including the light beam emitting apparatus, and an image forming apparatus including the light scanning apparatus.

2. Description of the Related Art

Light scanning apparatus are used in image forming apparatus such as an electrophotographic copying machine and a laser beam printer, which are configured to form images by using an electrophotographic process. In the electrophotographic process, the light scanning apparatus generally scans a photosensitive member with a light beam (laser beam) which blinks on and off in accordance with image signals so as to form an electrostatic latent image on the photosensitive member. The electrostatic latent image is developed with developer (toner) into a developer image. The developer image is transferred onto a recording medium. The developer image on the recording medium is fixed onto the recording medium by heat and pressure. In this way, images are formed.

The light scanning apparatus includes semiconductor lasers as light sources. The semiconductor lasers are each configured to emit a light beam which is modulated in accordance with image signals. The light beam is converted into a substantially parallel light beam by a collimator lens. The substantially parallel light beam is deflected by a rotary polygon mirror of a deflecting device. The deflected light beam is imaged on the photosensitive member by imaging optical elements as a light spot which moves in a main scanning direction on the photosensitive member. The light beam repeatedly scans on the rotating photosensitive member in the main scanning direction so that the electrostatic latent image is formed on the photosensitive member.

In the following description, the main scanning direction refers to a direction (a direction in which the light beam is deflected (reflected) by the deflecting device) perpendicular to a rotation axis (or pivot axis) of the deflecting device and an optical axis of imaging optics. A direction of an optical axis of incident optics between the light source and the deflecting device is different from a direction of an optical axis of scanning optics between the deflecting device and the photosensitive member. A sub-scanning direction refers to a direction (a direction which is parallel to the rotation axis (or pivot axis) of the deflecting device) perpendicular to the optical axis of the imaging optics and the main scanning direction. A main scanning cross-section refers to a plane including the optical axis of the imaging optics and the main scanning direction. A sub-scanning cross-section refers to a cross-section which includes the optical axis of the imaging optics and is perpendicular to the main scanning cross-section.

In recent years, in order to increase a processing speed and a scanning density of the light scanning apparatus, multi-beam light sources have been employed. A surface emitting laser (a vertical cavity surface emitting laser: VCSEL) can be easily used in arrays, and hence there have been proposed a wide variety of light scanning apparatus using a surface emitting laser array as a light source of the light scanning apparatus.

In the light scanning apparatus, a direction of light beams to be emitted from the light source (optical axis direction) influences optical characteristics of imaging optics. Thus, the optical axis direction needs to be adjusted with accuracy of the scale of micrometer. When an emission position of the light source is displaced back and forth with respect to a predetermined position along the optical axis direction (direction of depth of focus), an error caused by the displacement is expanded about tens of times to hundreds of times on the photosensitive member, resulting in an error in a focal position of the light beam on the surface of the photosensitive member (hereinafter referred to as "error of focal position"). In other words, the error of focal position expanded in accordance with an axial magnification in the imaging optics occurs.

Specifically, for example, when a spot diameter of the light beam on the photosensitive member is set to 50 µm, a depth of focus is set to 4 mm, and field curvature is set to 2 mm, tolerance of error of focal position in the direction of depth of focus is 2 mm. In this case, when the axial magnification in the light scanning apparatus is set to a magnification of one hundred times, tolerance of error of the emission position of the light source in the optical axis direction is 20 µm or less.

When the relationship described above is applied to a light beam emitting apparatus including a dual-beam semiconductor laser array in which an interval between two light emitting points is 50 µm, an inclination of a light source corresponding to a difference in position along the direction of depth of focus between the two light emitting points is permissible up to 21.8°. Meanwhile, in a light beam emitting apparatus including a multi-beam semiconductor laser array having several light emitting points to several tens of light emitting points, tolerance of the inclination of the light source is small. For example, in a case where an interval between two light emitting points at both ends out of ten light emitting points is 200 µm, in order to suppress the error along a direction of depth of focus between the two light emitting points to 20 µm or less, the inclination of the light source needs to be set to 5.7° or less. In particular, the surface emitting laser array include a large number of light emitting points, and hence need to be mounted with higher accuracy.

In view of the above-mentioned circumstances, Japanese Patent Application Laid-Open No. 2004-006592 proposes a method of mounting a reference surface of a light source including a surface emitting laser array perpendicularly to an optical axis of a light beam emitting apparatus with high accuracy. In Japanese Patent Application Laid-Open No. 2004-006592, a reference surface parallel to a plane including light emitting points of the surface emitting laser array is provided on an upper surface of a package portion of the light source. The reference surface of the light source is brought into abutment with a reference surface (three abutment portions) of a holding member configured to hold the light source. In this way, the reference surface of the light source is mounted perpendicularly to the optical axis of the light beam emitting apparatus with high accuracy.

However, as disclosed in Japanese Patent Application Laid-Open No. 2004-006592, in order to hold the light source by the holding member irrespective of array directions of the plurality of light emitting points, heights of the three abutment portions in the optical axis direction, which serve as the reference surface of the holding member, need to be set with significantly high accuracy.

In other words, there is a problem in that, in order that an array line (first straight line) connecting two light emitting points which are farthest from each other be arranged perpendicularly to the optical axis of the light beam emitting apparatus, differences in height in the optical axis direction among the three abutment portions need to be significantly reduced.

SUMMARY OF THE INVENTION

The present invention provides a light beam emitting apparatus, a light scanning apparatus, and an image forming apparatus, which increase tolerance of differences in height in an optical axis direction among three abutment portions while maintaining a perpendicularity of a light source with respect to an optical axis of the light beam emitting apparatus.

According to a representative embodiment of the present invention, there is provided a light beam emitting apparatus, comprising: a light source including a plurality of light emitting points configured to emit a plurality of light beams; and a holding member configured to hold the light source, the holding member including: a first abutment portion; a second abutment portion; and a third abutment portion, an emission direction of the plurality of light beams to be emitted from the plurality of light emitting points being regulated by the first abutment portion, the second abutment portion, and the third abutment portion being in abutment with the light source, wherein the first abutment portion, the second abutment portion, and the third abutment portion are in abutment with the light source so that, when the holding member and the light source held by the holding member are viewed along an optical path of the plurality of light beams emitted from the light source held by the holding member, an angle formed by a first straight line connecting two light emitting points farthest from each other of the plurality of light emitting points of the light source held by the holding member with a second straight line connecting the first abutment portion with the second abutment portion is smaller than each of an angle formed by the first straight line with a third straight line connecting the second abutment portion with the third abutment portion and an angle formed by the first straight line with a fourth straight line connecting the third abutment portion with the first abutment portion, and a distance between the first abutment portion and the second abutment portion is larger than each of a distance between the second abutment portion and the third abutment portion and a distance between the third abutment portion and the first abutment portion.

Further features of the present invention will become apparent from the following description of exemplary embodiments with reference to the attached drawings.

DESCRIPTION OF THE EMBODIMENTS

Now, embodiments of the present invention will be described with reference to the drawings.

First Embodiment

Now, a first embodiment of the present invention will be described.

(Image Forming Apparatus)

This embodiment will be described by taking a tandem type color printer as an example of an electrophotographic image forming apparatus (hereinafter referred to as "image forming apparatus").

Figure 7A:
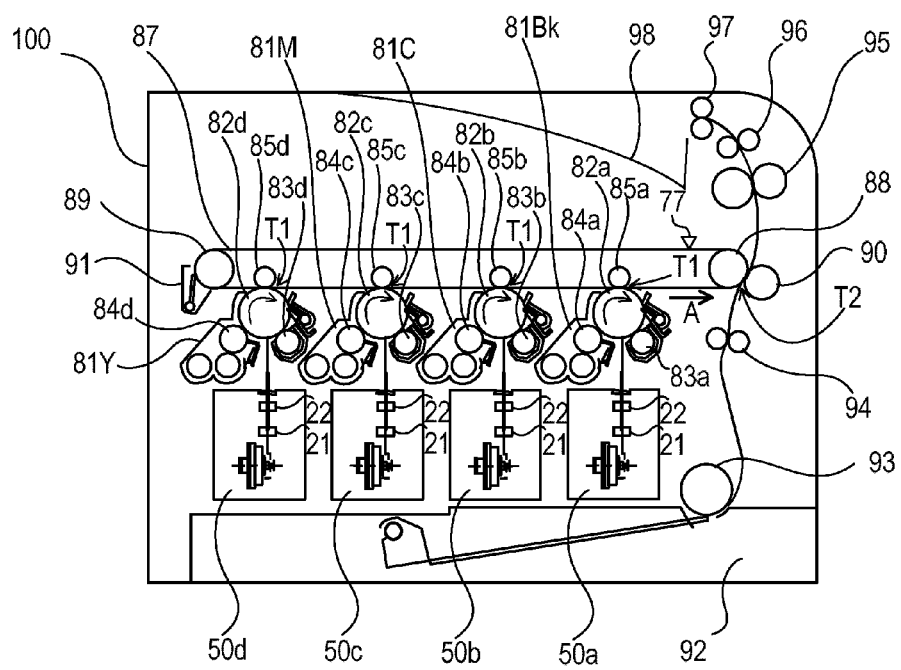
FIG. 7A is a sectional view of an image forming apparatus according to the first embodiment.
Figure 7B:
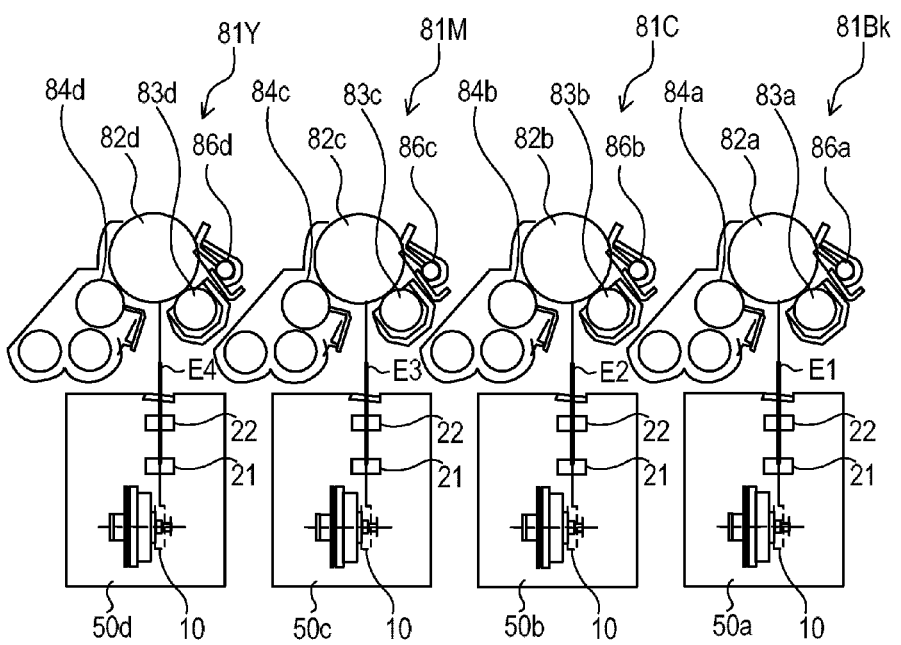
FIG. 7B is a sectional view of image forming portions according to the first embodiment.

FIGS. 7A and 7B illustrate an image forming apparatus 100 according to the first embodiment. FIG. 7A is a sectional view of the image forming apparatus 100. FIG. 7B is a sectional view of image forming portions 81 (81Bk, 81C, 81M, and 81Y).

The four image forming portions (image forming unit) 81 (81Bk, 81C, 81M, and 81Y) of the image forming apparatus 100 are arranged in a line at regular intervals. The image forming portion 81Bk forms images in black. The image forming portion 81C forms images in cyan. The image forming portion 81M forms images in magenta. The image forming portion 81Y forms images in yellow.

The image forming portions 81 respectively include drum-shaped electrophotographic photosensitive members (hereinafter referred to as "photosensitive drums") (82a, 82b, 82c, and 82d). Around each of the photosensitive drums 82, there are arranged a charging device (charging roller) 83, a light scanning apparatus (exposure apparatus) 50, a developing device 84, a primary transfer roller 85, and a drum cleaning device 86.

The light scanning apparatus 50 (50a, 50b, 50c, and 50d) are each arranged below the photosensitive drum 82 and between the charging device 83 and the developing device 84. The developing devices 84 (84a, 84b, 84c, and 84d) respectively contain black toner, cyan toner, magenta toner, and yellow toner.

The primary transfer rollers 85 (85a, 85b, 85c, and 85d) each bring an intermediate transfer belt 87 into abutment with the photosensitive drum 82 so as to form a primary transfer portion T1 between the intermediate transfer belt 87 and the photosensitive drum 82. The photosensitive drum 82 includes a negatively charged OPC photosensitive layer (organic photoconductor layer) formed around an aluminum drum base. The photosensitive drum 82 is rotated by a drive device (not shown) at a predetermined processing speed in a direction indicated by the arrow (clockwise direction in FIG. 7A).

The charging devices 83 (83a, 83b, 83c, and 83d) each charge a surface of the photosensitive drum 82 at a uniform predetermined negative potential with a charging bias applied from a charging bias power source (not shown). The light scanning apparatus 50 radiates a light beam (laser beam) E (E1, E2, E3, or E4), which is modulated in accordance with image signals (image information), to the uniformly charged surface of the photosensitive drum 82. In this way, an electrostatic latent image is formed on the photosensitive drum 82.

The developing devices 84 each develop (visualize), with the toner of the corresponding color, the electrostatic latent image formed on the photosensitive drum 82 into a toner image. In each of the primary transfer portions T1, the primary transfer roller 85 transfers the toner image on the photosensitive drum 82 onto the intermediate transfer belt 87. The drum cleaning devices 86 (86a, 86b, 86c, and 86d) each include a cleaning blade configured to remove, from the surface of the photosensitive drum 82, toner which is left on the surface of the photosensitive drum 82 after the primary transfer.

The intermediate transfer belt 87 is passed over a pair of belt conveying rollers 88 and 89, and is rotated (moved) in a direction indicated by the arrow A (counterclockwise direction in FIG. 7A). The intermediate transfer belt 87 is made of a dielectric resin such as a resin film made of polycarbonate or polyethylene terephthalate, and a resin film made of polyvinylidene fluoride.

The belt conveying roller 88 brings the intermediate transfer belt 87 into abutment with a secondary transfer roller 90 so as to form a secondary transfer portion T2 between the intermediate transfer belt 87 and the secondary transfer roller 90. On an outer side of the intermediate transfer belt 87, a belt cleaning device 91 is provided in the vicinity of the belt conveying roller 89. From a surface of the intermediate transfer belt 87, the belt cleaning device 91 removes and collects residual toner which is left on the surface of the intermediate transfer belt 87 after the secondary transfer.

A registration detection sensor 77 detects registration correction patterns for the respective colors to be formed on the intermediate transfer belt 87. Based on detection results to be obtained by the registration detection sensor 77, the image forming apparatus corrects a relative color misregistration among the colors.

A sheet feeding cassette 92 contains a recording medium. The recording medium refers to an object on which an image is formed by the image forming apparatus 100. The recording medium includes a sheet of paper and an OHP sheet. The recording medium is hereinafter referred to as a "sheet". The sheets in the sheet feeding cassette 92 are fed, one by one by a sheet feeding roller 93, to a position between a pair of registration rollers 94. The sheet is stopped once between the pair of registration rollers 94. Then, the sheet starts to be conveyed in synchronization with the toner image on the intermediate transfer belt 87. With this, in the secondary transfer portion T2, the toner image is transferred onto a predetermined position on the sheet. The sheet on which the toner image has been transferred in the secondary transfer portion T2 is heated and pressurized by a fixing device 95 so that the toner image is fixed to the sheet. In this way, an image is formed on the sheet. After the image formation, the sheet is conveyed by a pair of conveying rollers 96, and then is delivered by a pair of delivery rollers 97 onto a delivery tray 98 of an upper portion of the image forming apparatus 100.

(Light Scanning Apparatus)

Next, the light scanning apparatus 50 will be described. The four light scanning apparatus 50a, 50b, 50c, and 50d have the same structure, and hence the light scanning apparatus 50a will be described below.

Figure 5:
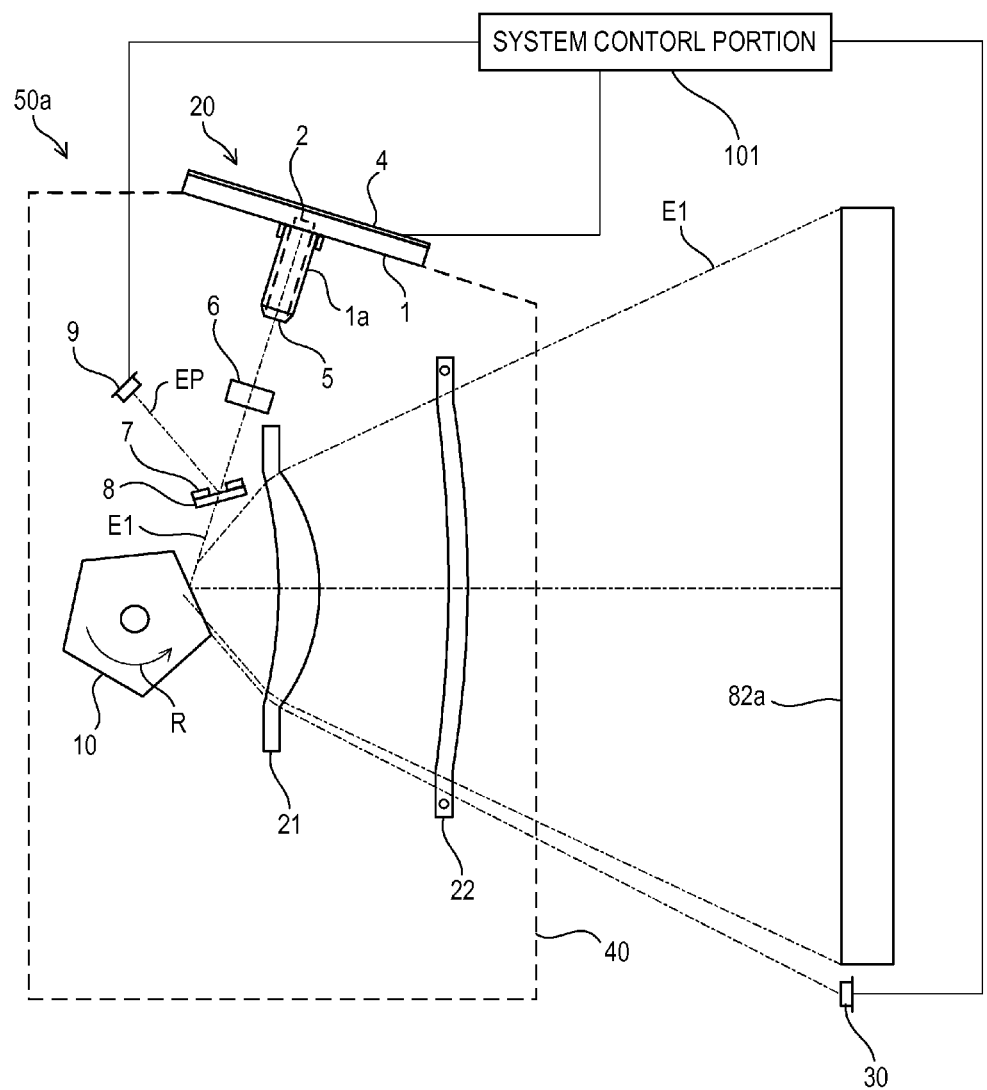
FIG. 5 is a plan view of a light scanning apparatus according to the first embodiment.

FIG. 5 is a plan view of the light scanning apparatus 50a according to the first embodiment. In the light scanning apparatus 50a, the light beam E1 is deflected (reflected) by a rotary polygon mirror (deflecting member) 10 so that the surface of the photosensitive drum 82a is scanned by the light beam E1. The light beam E1 is imaged as a light spot which moves on the photosensitive drum 82a.

As illustrated in FIG. 5, an optical element of the light scanning apparatus 50a is disposed in an optical box (hereinafter referred to as "housing") 40. The light scanning apparatus 50a includes a light beam emitting apparatus (laser unit) 20. The light beam emitting apparatus 20 is mounted to the housing 40.

A side wall of the housing 40 is provided with a fitting hole portion (not shown) and an oblong hole (not shown) configured to position a laser holder 1 of the light beam emitting apparatus 20. A fitting portion which is formed on an outer peripheral portion of a lens barrel holding portion 1a of the laser holder 1 is fitted to the fitting hole portion of the housing 40. With this, the laser holder 1 of the light beam emitting apparatus 20 is positioned with respect to the housing 40.

A cylindrical lens 6 has predetermined refractive power only in a sub-scanning direction. The cylindrical lens 6 forms the light beam E1 emitted from the light beam emitting apparatus 20 into a substantially line image (line image extending in a main scanning direction) on a deflecting surface (reflecting surface) of the rotary polygon mirror 10. A main scanning aperture portion 7 forms the light beam E1 emitted from the light beam emitting apparatus 20 into a desired optimal beam shape in the main scanning direction. A partial light beam EP of the light beam E1 is reflected by an incident surface of a half mirror 8 serving as a beam splitter so as to be guided to a light intensity sensor 9. The light beam E1 which has transmitted through the half mirror 8 is guided to the rotary polygon mirror 10.

The light intensity sensor 9 receives the partial light beam EP of the light beam E1 and sends a signal, which indicates a light intensity of the light beam E1, to a system control portion 101. The system control portion 101 measures the light intensity of the light beam E1 based on the signal from the light intensity sensor 9. Under an automatic power control (hereinafter abbreviated to "APC"), the light intensity of the light beam E1 is fed back to the system control portion 101. The system control portion 101 controls drive current of a laser drive circuit (not shown) provided on an electrical circuit board 4 so as to stabilize the light intensity of the light beam E1.

Further, as well as the light beam E1 which exposes the photosensitive drum 82a, the partial light beam EP to be guided to the light intensity sensor 9 is shaped by a sub-scanning aperture portion 1c (described below) and the main scanning aperture portion 7. Thus, even when the drive current of the laser drive circuit (not shown) is changed, a ratio between the light intensity of the light beam E1 which is guided to the rotary polygon mirror 10 so as to be imaged on the photosensitive drum 82a and the light intensity of the partial light beam EP which is guided to the light intensity sensor 9 is maintained constant. With this, the system control portion 101 can measure and control the light intensity with high accuracy.

The rotary polygon mirror 10 is rotated by a motor (not shown) at a fixed speed in a direction indicated by the arrow R (counterclockwise direction) in FIG. 5. The light beam E1 emitted from the light beam emitting apparatus 20 is deflected (reflected) by the deflecting surface (reflecting surface) of the rotary polygon mirror 10.

A first imaging lens 21 is a cylindrical lens having power in the main scanning direction. A second imaging lens 22 has power in the sub-scanning direction. The first imaging lens 21 forms imaging optics (fθ lens) cooperatively with the second imaging lens 22. The imaging optics images the light beam E1 on the surface of the photosensitive drum 82a as a spot which moves in the main scanning direction at a constant speed.

Note that, the first imaging lens 21 and the second imaging lens 22 are each made of a resin material such as a polycarbonate resin (PC) and a polymethyl methacrylate resin (PMMA). Thus, lens surfaces of the first imaging lens 21 and the second imaging lens 22 can be aspherized so that defocus with respect to the surface of the photosensitive drum 82a, which may be caused, for example, by field curvature, can be reduced at all main scanning positions.

A beam detector 30 (hereinafter referred to as "BD") serving as a synchronization detecting unit is provided on an outside of an image area and at a conjugated position which is substantially similar to a position of the surface of the photosensitive drum 82a. The BD 30 receives a light beam, and outputs a sync signal in the main scanning direction to the system control portion 101. The system control portion 101 controls a timing of a scanning start position of an edge portion of an image based on the sync signal from the BD 30. Note that, in order that the light beam to be received by the BD 30 does not interfere with the half mirror 8, the BD 30 is arranged on the outside of the image area, which is opposite to the light beam emitting apparatus 20. With this, the main scanning aperture portion 7 and the half mirror 8 are disposed closer to the rotary polygon mirror 10.

Figure 6:
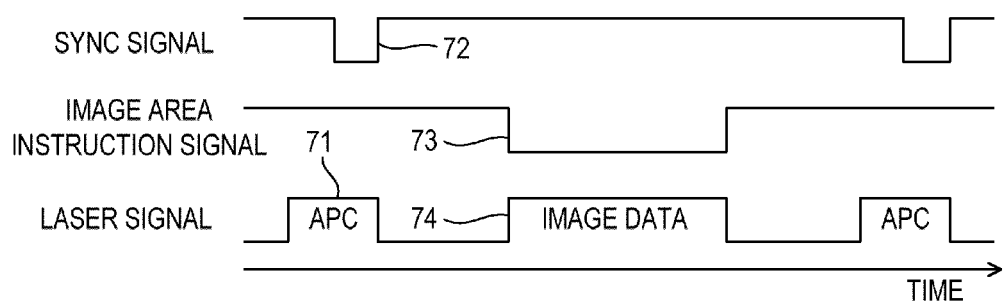
FIG. 6 is a timing chart illustrating APC and BD synchronization detection according to the first embodiment.

FIG. 6 is a timing chart illustrating the APC and the BD synchronization detection according to the first embodiment. Under the APC, the system control portion 101 controls the laser drive circuit (not shown) so as to output a laser signal 71. The light beam emitting apparatus 20 emits the light beam E1 according to the laser signal 71. The partial light beam EP reflected by the half mirror 8 enters the light intensity sensor 9. The system control portion 101 adjusts the light intensity of the light beam E1 based on the signal from the light intensity sensor 9.

The light beam E1, which is output from the light beam emitting apparatus 20 substantially simultaneously with completion of the APC, reaches the BD 30. The BD 30 outputs a sync signal 72 to the system control portion 101. The sync signal 72 is detected at the timing when the APC is completed, and hence the sync signal 72 can be detected with stable light intensity for each scanning. With this, errors in detection of the sync signal 72, which may be caused by fluctuation in light intensity, can be minimized.

After elapse of a predetermined time period from the reception of the sync signal 72, the system control portion 101 outputs an image area instruction signal 73 to the laser drive circuit (not shown). In response to the image area instruction signal 73, the laser drive circuit (not shown) outputs a laser signal (video signal) 74, according to image information, to the light beam emitting apparatus 20. The light beam emitting apparatus 20 emits the light beam E1 modulated according to the laser signal 74. The light beam E1 from the light beam emitting apparatus 20 forms an electrostatic latent image according to the image information on the surface of the photosensitive drum 82a. After elapse of a predetermined time period from completion of writing of the electrostatic latent image, the system control portion 101 restarts the APC.

Next, processes until the light beam E1 emitted from the light beam emitting apparatus 20 is imaged on the photosensitive drum 82a will be described.

The light beam E1 emitted from the light beam emitting apparatus 20 is limited in size in sub-scanning cross-section by the sub-scanning aperture portion 1c (FIG. 2B) of the laser holder 1, converted into substantially parallel light beams through a collimator lens 5, and then enters the cylindrical lens 6. The light beam E1 which has entered the cylindrical lens 6 transmits through the cylindrical lens 6 as it is in a main scanning cross-section, and is converged in the sub-scanning cross-section so as to be imaged on the rotary polygon mirror 10 as a substantially line image. The light beam E1 is limited in size also in main scanning cross-section by the main scanning aperture portion 7. In this way, the light beam E1 is shaped so that a predetermined beam diameter is secured on the surface of the photosensitive drum 82a.

On the other hand, the partial light beam EP of the light beam E1 is reflected by the incident surface of the half mirror 8, and enters the light intensity sensor 9. Most of the light beam E1, which has transmitted through the half mirror 8, is deflected by the rotating rotary polygon mirror 10. The BD 30 detects the light beam E1 and outputs the sync signal 72 so as to control the timing of the scanning start position of the light beam E1 according to the image information. With this, the image edge portions are aligned with each other. The light beam E1 emitted from the light beam emitting apparatus 20 at the controlled timing transmits through the first imaging lens 21. Then, the light beam E1 transmits through the second imaging lens 22, and is imaged on the surface of the photosensitive drum 82a.

The light scanning apparatus 50b, 50c, and 50d have the same structure as that of the light scanning apparatus 50a, and image the light beams E2, E3, and E4 on surfaces of the photosensitive drums 82b, 82c, and, 82d, respectively.

(Light Beam Emitting Apparatus)

Figure 2A:
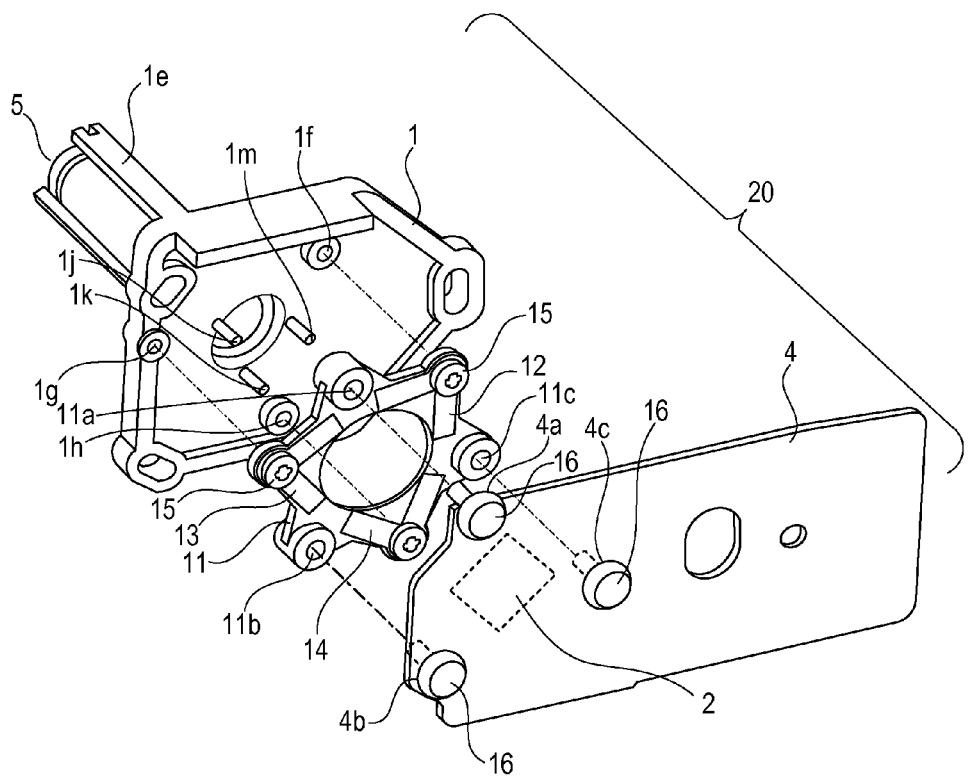
FIG. 2A is an exploded perspective view of a light beam emitting apparatus according to the first embodiment.
Figure 2B:
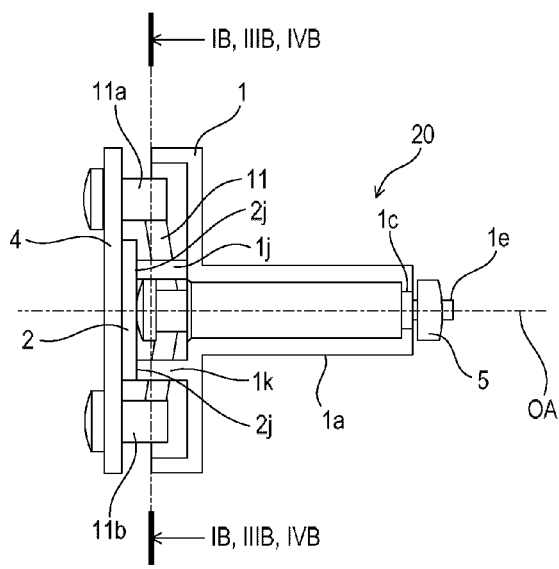
FIG. 2B is a sectional view of the light beam emitting apparatus.

Next, the light beam emitting apparatus 20 will be described. FIGS. 2A and 2B are views of the light beam emitting apparatus 20 according to the first embodiment. FIG. 2A is an exploded perspective view of the light beam emitting apparatus 20. FIG. 2B is a sectional view of the light beam emitting apparatus 20.

The light beam emitting apparatus 20 includes the laser holder (holding member) 1, a substrate mounting member (support member) 11, the electrical circuit board (substrate) 4, and a light source (light source member) 2 mounted to the electrical circuit board 4.

The electrical circuit board 4 holds the light source 2 and the laser drive circuit (not shown). The light source 2 is electrically connected to the laser drive circuit.

The laser holder 1 holds the light source 2 mounted to the electrical circuit board 4 through the substrate mounting member 11.

The laser holder 1 includes a first abutment portion 1m, a second abutment portion 1j, and a third abutment portion 1k. The three abutment portions 1j, 1k, and 1m serve as reference surfaces which is brought into abutment with a reference surface 2j of the light source 2 to regulate the light source 2 so that the reference surface 2j of the light source 2 is perpendicular to an optical axis OA of the light beam emitting apparatus 20. That is, the three abutment portions 1j, 1k, and 1m are brought into abutment with the reference surface 2j of the light source 2 to regulate an emission direction of a plurality of light beams to be emitted from the light source 2. In this embodiment, the emission direction of the plurality of light beams to be emitted from the light source 2 is regulated parallel to the optical axis OA of the light beam emitting apparatus 20.

The substrate mounting member 11 is configured to mount the electrical circuit board 4 to the laser holder 1. The substrate mounting member 11 is mounted to the laser holder 1 by screws 15 engaging with three screw holes 1f, 1g, and 1h provided in the laser holder 1. The electrical circuit board 4 is mounted to the substrate mounting member 11 by screws (fixing members) 16 engaging with three screw holes (fixing portion) 11a, 11b, and 11c provided in the substrate mounting member 11.

Urging members 12, 13, and 14 urge the substrate mounting member 11 toward the laser holder 1 so as to urge the electrical circuit board 4 toward the laser holder 1. With this, the three abutment portions 1*j*, 1*k*, and 1*m* are reliably brought into abutment with the reference surface 2*j* of the light source 2.

At the time of mounting the electrical circuit board 4 to the substrate mounting member 11, optical characteristics such as irradiation positions and intervals (intervals among spots of the light beams in the sub-scanning direction) of the light beams from the light beam emitting apparatus 20 are detected. After a coarse adjustment of a position of the electrical circuit board 4 is performed while detecting the optical characteristics, fixation portions 4*a*, 4*b*, and 4*c* of the electrical circuit board 4 are fixed to the screw holes 11*a*, 11*b*, and 11*c* of the substrate mounting member 11 by screws 16.

Note that, the screw holes 1*f*, 1*g*, and 1*h* of the laser holder 1 are formed at intervals of 120° about the optical axis OA. The screw holes 11*a*, 11*b*, and 11*c* of the substrate mounting member 11 are also formed at intervals of 120° about the optical axis OA.

The electrical circuit board 4 to which the light source 2 is mounted is fixed to the laser holder 1 at least at three positions. The electrical circuit board 4 may further include one or more fixation portions (fixation positions) to be fixed to the laser holder 1 in addition to the three fixation portions (fixation positions) 4*a*, 4*b*, and 4*c*.

As viewed from a traveling direction of the light beam E1 emitted from the light source 2 fixed to the laser holder 1, a center of gravity of a triangle formed by three fixation positions of the at least three fixation positions, which are closer to the light source 2 than the other fixation portion, is located within a triangle formed by the three abutment portions. Specifically, a center of gravity of a triangle formed by the screw holes 11*a*, 11*b*, and 11*c* of the substrate mounting member 11 is located within the triangle formed by the first abutment portion 1*m*, the second abutment portion 1*j*, and the third abutment portion 1*k*. In other words, as viewed in the traveling direction of the light beam E1 emitted from the light source 2 held by the laser holder 1, a center of gravity of a triangle formed by the three fixation portions 4*a*, 4*b*, and 4*c* which are closer to the light source 2 on the electrical circuit board 4 is located within the triangle formed by the three abutment portions 1*j*, 1*k*, and 1*m*.

Accordingly, the substrate mounting member 11 can stably support the electrical circuit board 4. Thus, after assembling of the light beam emitting apparatus 20, positions of a plurality of light emitting points of the light source 2 are hard to be displaced. As a result, irradiation positions and intervals (intervals among the spots of the light beams in the sub-scanning direction) can be stably maintained.

In FIG. 2B, the sub-scanning aperture portion 1*c* is provided at a distal end portion of the lens barrel holding portion 1*a* of the laser holder 1. The sub-scanning aperture portion 1*c* shapes the light beam E1 emitted from the light source 2 into a desired optimal shape in the sub-scanning direction.

The collimator lens 5 is disposed on an exit side of the sub-scanning aperture portion 1*c*. The collimator lens 5 converts each of the plurality of light beams which have passed through the sub-scanning aperture portion 1*c* into a substantially parallel light beam. Two bonding portions 1*e* extend in the emission direction from the distal end portion of the lens barrel holding portion 1*a* of the laser holder 1. The two bonding portions 1*e* are formed side by side in the main scanning direction. A position of the collimator lens 5 is adjusted while detecting optical characteristics such as irradiation positions and focus of the light beam E1 from the light beam emitting apparatus 20. After the position of the collimator lens 5 is determined, ultraviolet light is radiated to an ultraviolet-curable adhesive applied between the collimator lens 5 and each of the two bonding portions 1*e*. With this, the collimator lens 5 is fixed to the bonding portions 1*e* with an adhesive.

(Light Source)

Figure 1A:
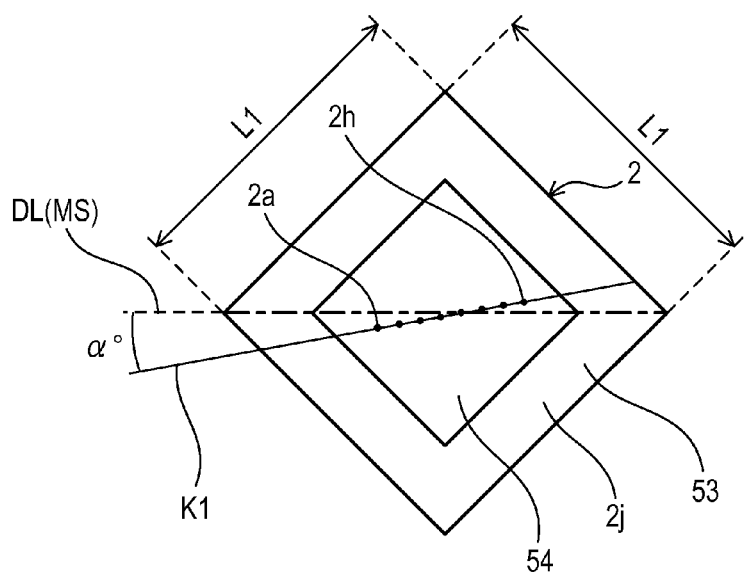
FIG. 1A is a front view of a light source according to a first embodiment.
Figure 1B:
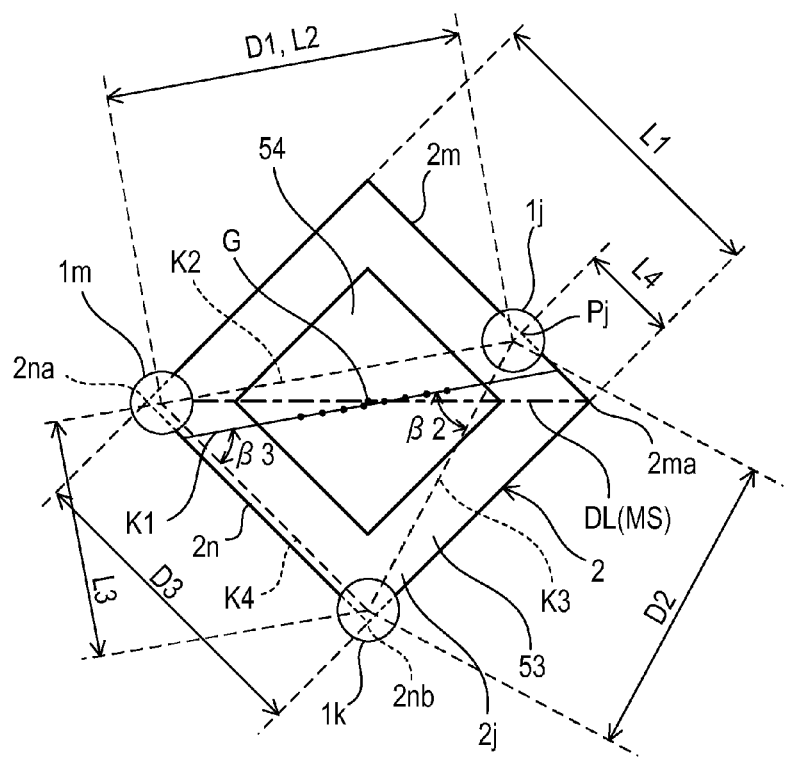
FIG. 1B is a sectional view taken along the line IB-IB in FIG. 2B.

Next, the light source (light source member) 2 will be described. FIGS. 1A and 1B are views of the light source 2 according to the first embodiment. FIG. 1A is a front view of the light source 2. FIG. 1B is a sectional view taken along the line IB-IB in FIG. 2B, in which components other than the light source 2 and the abutment portions 1*j*, 1*k*, and 1*m* are omitted. The light source 2 illustrated in FIG. 1B is viewed in a direction parallel to the light beam E1 emitted from the light source 2.

The light source 2 has a substantially quadrangular shape. As illustrated in FIG. 1A, the light source 2 includes a portion (surface emitting laser array) 54 in which a plurality of light emitting points are formed, and a package portion (base portion) 53 surrounding the portion 54. The package portion 53 of the light source 2 is formed into a substantially square with sides of a length L1. The portion 54 includes semiconductor lasers 2*a* to 2*h* serving as the plurality of light emitting points which emit a plurality of light beams. For example, vertical cavity surface emitting laser-diodes (VCSEL) may be used as the semiconductor lasers 2*a* to 2*h*. The semiconductor lasers 2*a* to 2*h* are hereinafter referred to as "light emitting points 2*a* to 2*h*".

The plurality of light beams emitted from the light source 2 pass through an inside of the triangle formed by the first abutment portion 1*m*, the second abutment portion 1*j*, and the third abutment portion 1*k*. The three abutment portions 1*m*, 1*j*, and 1*k* are brought into abutment with the package portion 53 of the light source 2.

The reference surface 2*j* of the light source 2 is formed on the package portion 53 so as to be parallel to a plane of the portion 54 in which the eight light emitting points 2*a* to 2*h* are formed.

The light emitting points 2*a* to 2*h* are arrayed substantially along a diagonal line DL of the light source 2. More specifically, the light emitting points 2*a* to 2*h* are arrayed along an array line (hereinafter referred to as "first straight line") K1 connecting two light emitting points 2*a* and 2*h* which are farthest from each other. The first straight line K1 forms an angle α° with the diagonal line DL of the light source 2. In this embodiment, the diagonal line DL is parallel to the main scanning direction.

In order that spots of the light beams emitted from the light emitting points 2*a* to 2*h* are formed at a predetermined pitch (predetermined value) in the sub-scanning direction on the photosensitive drum 82*a*, the first straight line K1 is inclined at the angle α° with respect to the diagonal line DL. In this embodiment, the diagonal line DL matches a main scanning direction MS, but the diagonal line DL needs not necessarily match the main scanning direction MS.

The reason why the first straight line K1 of the plurality of light emitting points 2*a* to 2*h* is inclined with respect to the main scanning direction MS is because the plurality of light emitting points 2*a* to 2*h* are arrayed at predetermined intervals in the sub-scanning direction. An adjustment of the intervals among the plurality of light emitting points 2*a* to 2*h* in the sub-scanning direction will be described below. In FIG. 5, the fitting portion which is provided on the outer peripheral portion of the lens barrel holding portion 1*a* of the laser holder 1 is fitted in the fitting hole portion of the housing 40 so that the laser holder 1 of the light beam emitting apparatus 20 is positioned with respect to the housing 40. Then, a slight rotation of the laser holder 1 rotates the light source 2 slightly so that the intervals (distances) in the sub-scanning direction among the light emitting points $2a$ to $2h$ of the light source 2 are adjusted. Specifically, the intervals among the light emitting points $2a$ to $2h$ are adjusted so that the pitches (distances among the light beams in the sub-scanning direction) among the plurality of light beams from the light emitting points $2a$ to $2h$ of the light source 2 at the time when the photosensitive drum $82a$ is scanned with the plurality of light beams are each substantially equal to a predetermined value.

In this embodiment, the light emitting points $2a$ to $2h$ are arrayed linearly along the first straight line K1, but need not necessarily be linearly arrayed.

As illustrated in FIG. 1B, the first abutment portion $1m$, the second abutment portion $1j$, and the third abutment portion $1k$ are in abutment with edge portions of the light source 2. The first abutment portion $1m$ and the third abutment portion $1k$ are in abutment with both end portions (both apexes) $2na$ and $2nb$ of one side (edge portion) $2n$, which has the length L1, of the light source 2, respectively. On other side (edge portion) $2m$ opposed to the one side $2n$, the second abutment portion $1j$ is in abutment with the other side $2m$ at a position Pj between a central portion of the other side $2m$ and the first straight line K1. The position Pj is away from an end portion $2ma$ of the other side $2m$ by a distance L4, the end portion $2ma$ being on the side of the diagonal line DL closer to the first straight line K1. The distance L4 is smaller than half of the length L1 of each side (L4<L1/2).

An angle β1 is formed by the first straight line (array line) K1 connecting the two light emitting points $2a$ and $2h$, which are farthest from each other in the light source 2 held by the laser holder 1, with a second straight line K2 connecting the first abutment portion $1m$ with the second abutment portion $1j$. In this embodiment, the second straight line K2 is substantially parallel to the first straight line K1, and hence the angle β1 is almost zero. Thus, the angle β1 is not shown. An angle β2 is formed by the first straight line K1 and a third straight line K3 connecting the second abutment portion $1j$ with the third abutment portion $1k$. An angle β3 is formed by the first straight line K1 with a fourth straight line K4 connecting the third abutment portion $1k$ with the first abutment portion $1m$. When the laser holder 1 and the light source 2 held by the laser holder 1 are viewed along an optical path of the plurality of light beams emitted from the light source 2 held by the laser holder 1, the angle β1 is smaller than each of the angle β2 and the angle β3 (β1<β2 and β1<β3).

A distance D1 between the first abutment portion $1m$ and the second abutment portion $1j$ is larger than a distance D2 between the second abutment portion $1j$ and the third abutment portion $1k$ (D1>D2). The distance D1 is larger than a distance D3 between the third abutment portion $1k$ and the first abutment portion $1m$ (D1>D3).

By the way, the first abutment portion $1m$ and the second abutment portion $1j$ which are farthest from each other of the three abutment portions $1j$, $1k$, and $1m$ in a direction along the first straight line K1 are separated from each other by a distance L2. The distance L2 corresponds to a distance between a center of the first abutment portion $1m$ and a center of the second abutment portion $1j$ in the direction along the first straight line K1. The two abutment portions $1k$ and $1m$ which are farthest from each other of the three abutment portions $1j$, $1k$, and $1m$ in a direction perpendicular to the first straight line K1 are separated from each other by a distance L3. The distance L3 corresponds to a distance between a center of the abutment portion $1k$ and the center of the abutment portion $1m$ in the direction perpendicular to the first straight line K1. The distance L2 is larger than the distance L3 (A relationship of L2>L3 is satisfied.).

A difference in height between the abutment portion $1j$ and the abutment portion $1m$ directly influences a perpendicularity of the first straight line K1 of the light emitting points $2a$ to $2h$ with respect to the optical axis OA. Thus, when the difference in height between the first abutment portion $1m$ and the second abutment portion $1j$ is equal to or less than a predetermined value, a position of the light source 2 in a focus direction can be secured with high accuracy. As a result, without limiting a difference in height between the abutment portions $1k$ and $1j$ and a difference in height between the abutment portions $1k$ and $1m$ to small values more than is necessary, the light source 2 can be mounted to the laser holder 1 while maintaining the position of the light source 2 in the focus direction with high accuracy.

With such a simple structure, the accuracy which is required at the time of setting heights of the three abutment portions $1j$, $1k$, and $1m$ can be reduced. Thus, errors of focal positions between the plurality of light beams emitted from the plurality of light emitting points $2a$ to $2h$ can be reduced. Further, the light emitting points $2a$ to $2h$ are arrayed in the direction along the first straight line K1 which extends substantially along the diagonal line DL of the package portion 53 of the light source 2. Thus, the distance L2 between the first abutment portion $1m$ and the second abutment portion $1j$ in the direction along the first straight line K1 can be increased. Therefore, tolerance of the difference in height between the first abutment portion $1m$ and the second abutment portion $1j$, which is required for regulating the perpendicularity of the first straight line K1 with respect to the optical axis OA of the light beam emitting apparatus 20, can be increased.

Further, when a magnification (hereinafter referred to as "main scanning magnification") in the main scanning direction of the light scanning apparatus $50a$ and a magnification (hereinafter referred to as "sub-scanning magnification") in the sub-scanning direction are compared with each other, the main scanning magnification is set to be higher than the sub-scanning magnification. In order to increase the sub-scanning magnification, a longer distance needs to be secured between the cylindrical lens 6 and the rotary polygon mirror 10, with the result that an incident optical path is elongated. In this embodiment, in order to downsize the light scanning apparatus $50a$, the main scanning magnification is set to be higher than the sub-scanning magnification. Thus, errors of focal positions on the photosensitive drum $82a$ occur on a larger scale in the main scanning direction than in the sub-scanning direction. The first straight line K1 connecting the two light emitting points $2a$ and $2h$ which are farthest from each other extends substantially along the main scanning direction MS. Thus, with respect to the first straight line K1, differences in height in the optical axis direction between the three abutment portions $1j$, $1k$, and $1m$ are more important. According to this embodiment, the distance L2 between the first abutment portion $1m$ and the second abutment portion $1j$ which are farthest from each other in the direction along the first straight line K1 is larger than the distance L3 between the two abutment portions $1k$ and $1m$ which are farthest from each other in the direction perpendicular to the first straight line K1. That is, the relationship of L2>L3 is satisfied. Thus, at the time of setting the reference surface $2j$ of the light source 2 perpendicularly to the optical axis OA of the light beam emitting apparatus 20, the tolerance of the differences in height in the optical axis direction between the three abutment portions $1j$, $1k$, and $1m$ can be increased in the main scanning direction MS in which the errors of focal positions occur on a larger scale. Therefore, the errors of focal positions can be reduced.

As described above, the distance L2 between the first abutment portion 1m and the second abutment portion 1j which are farthest from each other in the direction along the first straight line K1 of the plurality of light emitting points 2a to 2h is larger than the distance L3 between the two abutment portions 1k and 1m which are farthest from each other in the direction perpendicular to the first straight line K1. That is, the relationship of L2>L3 is satisfied. The perpendicularity of the first straight line K1 of the light source 2 with respect to the optical axis OA can be directly regulated. Thus, without unnecessarily limiting the tolerance of the accuracy which is required at the time of setting the heights of the three abutment portions 1j, 1k, and 1m in the optical axis direction, the accuracy of the position of the light source 2 in the focus direction can be maintained. With such a simple structure, the tolerance of the differences in height in the optical axis direction among the three abutment portions 1j, 1k, and 1m can be increased. As a result, the errors of focal positions among the beams of the multi-beam system can be reduced.

Further, the plurality of light emitting points 2a to 2h are arranged substantially along the diagonal line DL of the package portion 53 of the light source 2, and hence the distance L2 between the two abutment portions 1j and 1m can be easily increased. Thus, the light source 2 can be easily mounted to the light beam emitting apparatus 20 with high accuracy so that the reference surface 2j of the light source 2 is perpendicular to the optical axis OA of the light beam emitting apparatus 20.

Further, the three abutment portions 1j, 1k, and 1m are formed on the laser holder 1 in a manner that a center of gravity G of the package portion 53 of the light source 2 is located within the triangle formed by the three abutment portions 1j, 1k, and 1m. With this, the laser holder 1 can stably hold the light source 2.

According to this embodiment, the tolerance of the differences in height in the optical axis direction among the three abutment portions 1j, 1k, and 1m can be increased while maintaining the perpendicularity of the light source 2 with respect to the optical axis OA of the light beam emitting apparatus 20. As a result, the errors of focal positions among the beams of the multi-beam system can be reduced, and images of high quality can be obtained.

Second Embodiment

Next, a second embodiment of the present invention will be described. In the second embodiment, the same components as those in the first embodiment are denoted by the same reference symbols, and descriptions thereof are omitted herein. Specifically, an image forming apparatus 100, a light scanning apparatus 50, and a light beam emitting apparatus 20 according to the second embodiment are the same as those according to the first embodiment, and descriptions thereof are omitted herein. A light source (light source member) 202 according to the second embodiment will be described below.

Figure 3A:
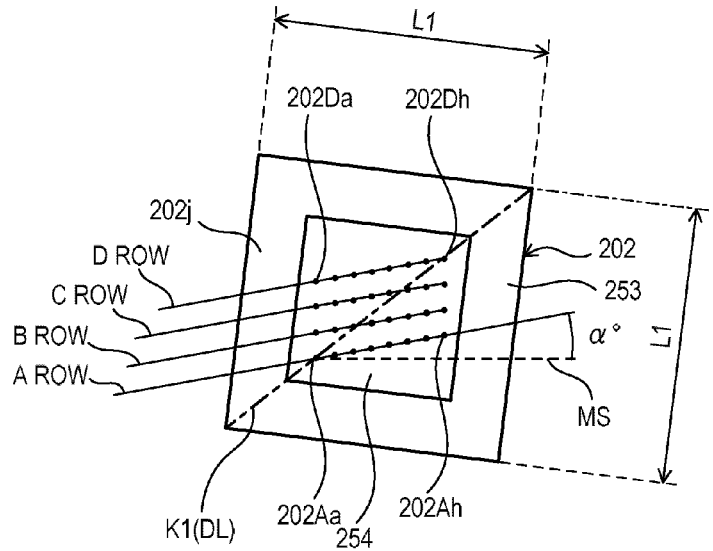
FIG. 3A is a front view of a light source according to a second embodiment.
Figure 3B:
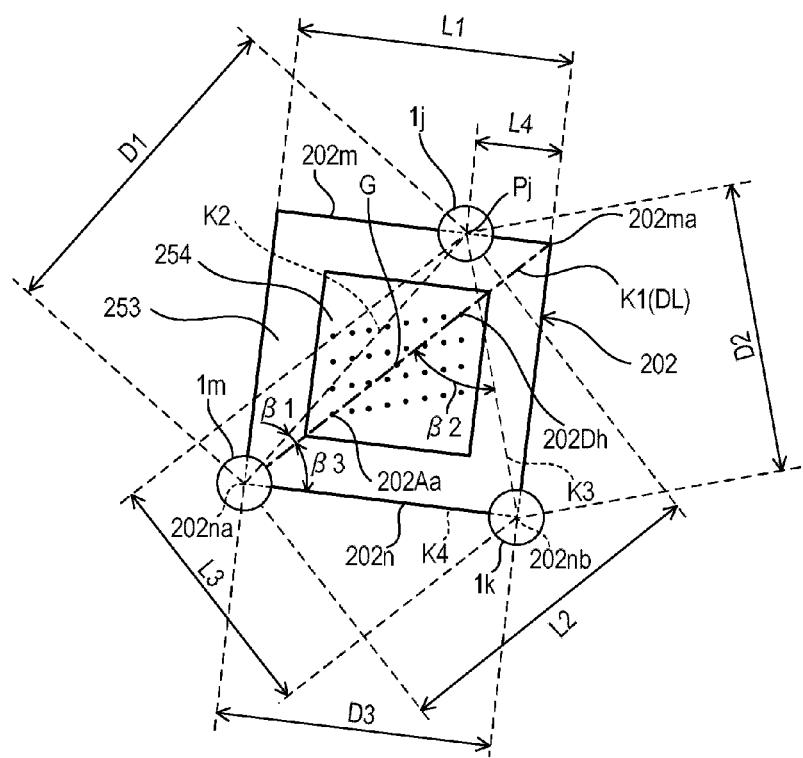
FIG. 3B is a sectional view of a light beam emitting apparatus according to the second embodiment.

FIGS. 3A and 3B are views of the light source 202 according to the second embodiment. FIG. 3A is a front view of the light source 202 according to the second embodiment. FIG. 3B is a sectional view of the light beam emitting apparatus 20 according to the second embodiment, which is taken along the line IIIB-IIIB in FIG. 2B as in the first embodiment. In FIG. 3B, components other than the light source 202 and the abutment portions 1j, 1k, and 1m are omitted. The light source 202 illustrated in FIG. 3B is viewed in a direction parallel to light beams to be emitted from the light source 202.

The light source 202 has a substantially quadrangular shape. As illustrated in FIG. 3A, the light source 202 includes a portion (surface emitting laser arrays) 254 on which a plurality of light emitting points are formed, and a package portion (base portion) 253 surrounding the portion 254. The package portion 253 of the light source 202 is formed into a substantially square with the sides of the length L1. The portion 254 includes semiconductor lasers 202Aa to 202Dh serving as the plurality of light emitting points. For example, vertical cavity surface emitting laser-diodes (VCSEL) may be used as the semiconductor lasers 202Aa to 202Dh. The semiconductor lasers 202Aa to 202Dh are hereafter referred to as "light emitting points 202Aa to 202Dh".

The light emitting points 202Aa to 202Dh are arrayed in four rows of from a row A to a row D in the sub-scanning direction. The rows A to D are parallel to each other. The rows A to D each include eight light emitting points. The rows A to D are inclined at the angle α° with respect to the main scanning direction MS. Eight light emitting points 202Aa to 202Ah are arrayed in the row A. Eight light emitting points 202Ba to 202Bh are arrayed in the row B. Eight light emitting points 202Ca to 202Ch are arrayed in the row C. Eight light emitting points 202Da to 202Dh are arrayed in the row D. The light source 202 includes a total of thirty-two light emitting points 202Aa to 202Dh. In this embodiment, the light emitting points 202Aa to 202Dh are arrayed linearly along the rows A to D, but need not necessarily be linearly arrayed.

The plurality of light beams emitted from the light source 202 pass through the inside of the triangle formed by the first abutment portion 1m, the second abutment portion 1j, and the third abutment portion 1k. The three abutment portions 1m, 1j, and 1k are configured to be held in abutment with the package portion 253 of the light source 202.

A reference surface 202j of the light source 202 is formed on the package portion 253 so as to be parallel to a plane of the portion 254 in which the thirty-two light emitting points 202Aa to 202Dh are provided. Note that, in this embodiment, two light emitting points farthest from each other of the plurality of light emitting points 202Aa to 202Dh are the light emitting point 202Aa and the light emitting point 202Dh. The first straight line (array line) K1 connecting the two light emitting points 202Aa and 202Dh which are farthest from each other extends substantially along the diagonal line DL of the light source 202. The two light emitting points 202Aa and 202Dh which are farthest from each other are arranged on the diagonal line DL of the light source 202. In this embodiment, the first straight line K1 matches the diagonal line DL, but needs not necessarily match the diagonal line DL.

As illustrated in FIG. 3B, the first abutment portion 1m, the second abutment portion 1j, and the third abutment portion 1k are in abutment with edge portions of the light source 202. The first abutment portion 1m and the third abutment portion 1k are in abutment with both end portions (both apexes) 202na and 202nb of one side (edge portion) 202n, which has the length L1, of the light source 202, respectively. On other side (edge portion) 202m opposed to the one side 202n, the second abutment portion 1j is in abutment with the other side 202m at the position Pj between a central portion of the other side 202m and the first straight line K1. The position Pj is away from an end portion 202ma of the other side 202m by the distance L4, the end portion 202ma being on the side of the diagonal line DL closer to the first straight line K1. Note that, the distance L4 is smaller than half of the length L1 of each side (L4<L1/2).

The angle β1 is formed by the first straight line K1 connecting the two light emitting points 202Aa and 202Dh, which are farthest from each other in the light source 202 held by the laser holder 1, with the second straight line K2 connecting the first abutment portion 1m with the second abutment portion 1j. The angle β2 is formed by the first straight line K1 with the third straight line K3 connecting the second abutment portion 1j with the third abutment portion 1k. The angle β3 is formed by the first straight line K1 with the fourth straight line K4 connecting the third abutment portion 1k with the first abutment portion 1m. When the laser holder 1 and the light source 202 held by the laser holder 1 are viewed along an optical path of the plurality of light beams emitted from the light source 202 held by the laser holder 1, the angle β1 is smaller than each of the angle β2 and the angle β3 (β1<β2 and β1<β3). Note that, the second straight line K2 may be parallel to the first straight line K1.

The distance D1 between the first abutment portion 1m and the second abutment portion 1j is larger than the distance D2 between the second abutment portion 1j and the third abutment portion 1k (D1>D2). The distance D1 is larger also than the distance D3 between the third abutment portion 1k and the first abutment portion 1m (D1>D3).

By the way, the first abutment portion 1m and the second abutment portion 1j which are farthest from each other of the three abutment portions 1j, 1k, and 1m in the direction along the first straight line K1 are separated from each other by the distance L2. The distance L2 corresponds to the distance between the center of the second abutment portion 1j and the center of the first abutment portion 1m in the direction along the first straight line K1. The two abutment portions 1k and 1j which are farthest from each other of the three abutment portions 1j, 1k, and 1m in the direction perpendicular to the first straight line K1 are separated from each other by the distance L3. The distance L3 corresponds to the distance between the center of the abutment portion 1k and the center of the abutment portion 1j in the direction perpendicular to the first straight line K1. The distance L2 is larger than the distance L3 (A relationship of L2>L3 is satisfied.).

The three abutment portions 1j, 1k, and 1m are formed on the laser holder 1 in a manner that the center of gravity G of the package portion 253 of the light source 202 is located within the triangle formed by the three abutment portions 1j, 1k, and 1m. With this, the laser holder 1 can stably hold the light source 202.

The difference in height between the abutment portion 1j and the abutment portion 1m directly influences the perpendicularity of the first straight line K1 with respect to the optical axis OA. Thus, when the difference in height between the first abutment portion 1m and the second abutment portion 1j is equal to or less than a predetermined value, the position of the light source 202 in the focus direction can be secured with high accuracy. As a result, without limiting the difference in height between the abutment portions 1k and 1j and the difference in height between the abutment portions 1k and 1m to small values more than is necessary, the light source 202 can be mounted to the laser holder 1 while securing accuracy of the position in the focus direction.

With such a simple structure, the accuracy which is required at the time of setting the heights of the three abutment portions 1j, 1k, and 1m can be reduced. Thus, errors of focal positions between the plurality of light beams emitted from the plurality of light emitting points 202Aa to 202Dh can be reduced. Further, the two light emitting points 202Aa and 202Dh which are farthest from each other are arrayed substantially on the diagonal line DL of the package portion 253 of the light source 202. Thus, the distance L2 between the abutment portions 1j and 1m in the direction along the first straight line K1 can be increased. Therefore, tolerance of the difference in height between the abutment portion 1j and the abutment portion 1m, which is required for regulating the perpendicularity of the first straight line K1 with respect to the optical axis OA, can be increased.

The number of light emitting points to be arrayed in a direction of a higher one of the main scanning magnification and the sub-scanning magnification of the light scanning apparatus 50a is larger than the number of light emitting points to be arrayed in a direction of a lower one of the magnifications. Also in this embodiment, the main scanning magnification of the light scanning apparatus 50a is set to be higher than the sub-scanning magnification. Thus, the errors of focal positions on the photosensitive drum 82a occur on a larger scale in the main scanning direction than in the sub-scanning direction. The thirty-two light emitting points 202Aa to 202Dh of the light source 202 include light emitting points arrayed in eight rows in the main scanning direction and light emitting points arrayed in four rows in the sub-scanning direction. The number of the light emitting points in the main scanning direction of the higher magnification is larger than the number of the light emitting points in the sub-scanning direction, and hence the first straight line K1 is closer to the main scanning direction than to the sub-scanning direction. Thus, the distance L2 between the first abutment portion 1m and the second abutment portion 1j which are farthest from each other in the direction along the first straight line K1 is larger than the distance L3 between the two abutment portions 1k and 1j which are farthest from each other in the direction perpendicular to the first straight line K1. That is, the relationship of L2>L3 is satisfied. Thus, at the time of setting the reference surface 202j of the light source 202 perpendicularly to the optical axis OA, the tolerance of the accuracy can be increased in the main scanning direction MS in which the errors of focal positions occur on a larger scale. Therefore, the errors of focal positions can be reduced.

As described above, the light source 202 including the plurality of light emitting points in both the main scanning direction and the sub-scanning direction also provides the same advantages and functions as those in the first embodiment.

Third Embodiment

Next, a third embodiment of the present invention will be described. In the third embodiment, the same components as those in the first embodiment are denoted by the same reference symbols, and descriptions thereof are omitted herein. Specifically, an image forming apparatus 100, a light scanning apparatus 50, and a light beam emitting apparatus 20 according to the third embodiment are the same as those according to the first embodiment, and descriptions thereof are omitted herein. A light source (light source member) 302 according to the third embodiment will be described below.

Figure 4A:
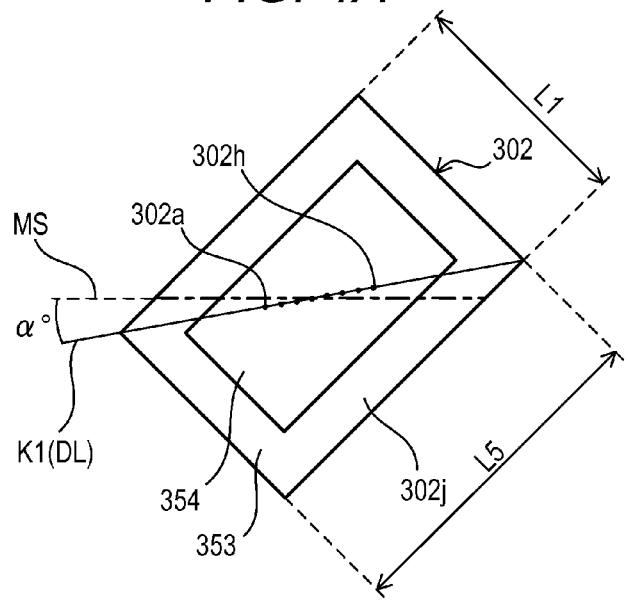
FIG. 4A is a front view of a light source according to a third embodiment.
Figure 4B:
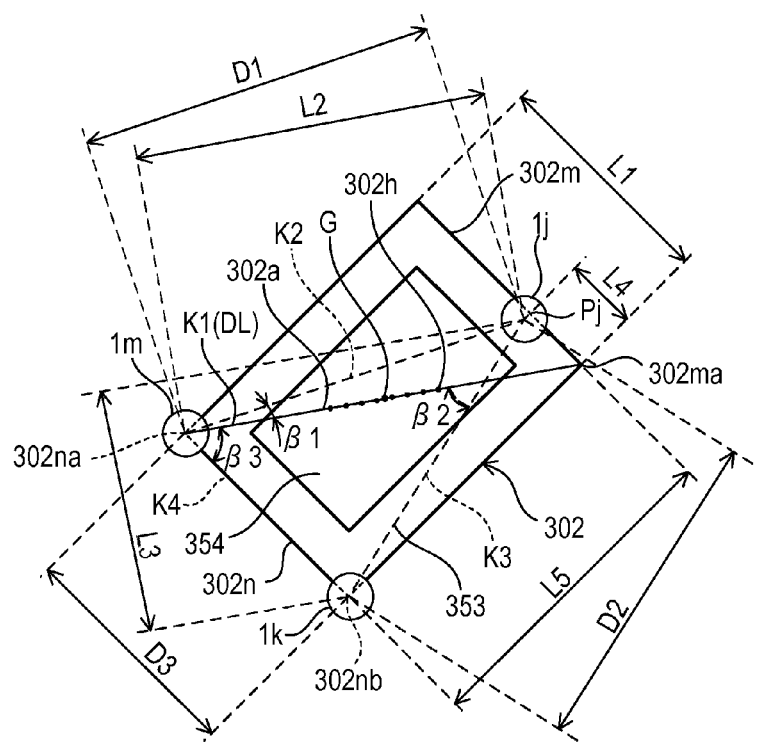
FIG. 4B is a sectional view of a light beam emitting apparatus according to the third embodiment.

FIG. 4A is a view of the light source 302 according to the third embodiment. FIG. 4A is a front view of the light source 302 according to the third embodiment. FIG. 4B is a sectional view of the light beam emitting apparatus 20 according to the third embodiment, which is taken along the line IVB-IVB in FIG. 2B as in the first embodiment. In FIG. 4B, components other than the light source 302 and the abutment portions 1j, 1k, and 1m are omitted. The light source 302 illustrated in FIG. 4B is viewed in a direction parallel to light beams to be emitted from the light source 302.

The light source 302 has a substantially quadrangular shape. As illustrated in FIG. 4A, the light source 302 includes a portion (surface emitting laser array) 354 on which a plurality of light emitting points are formed, and a package portion (base portion) 353 surrounding the portion 354. The package portion 353 of the light source 302 is formed into a rectangle with short sides of the length L1 and long sides of a length L5. The portion 354 includes semiconductor lasers 302a to 302h serving as the plurality of light emitting points (light sources). For example, vertical cavity surface emitting laser-diodes (VCSEL) may be used as the semiconductor lasers 302a to 302h. The semiconductor lasers 302a to 302h are hereinafter referred to as "light emitting points 302a to 302h".

In this embodiment, two light emitting points farthest from each other of the plurality of light emitting points 302a to 302h are the light emitting point 302a and the light emitting point 302h. The two light emitting points 302a and 302h which are farthest from each other are arranged on the diagonal line DL of the light source 302. The light emitting points 302a to 302h are arrayed along the first straight line (array line) K1 connecting the two light emitting points 302a and 302h which are farthest from each other. In this embodiment, the first straight line K1 matches the diagonal line DL of the light source 302, but needs not necessarily match the diagonal line DL. The first straight line K1 is inclined at the angle α° with respect to the main scanning direction MS.

In this embodiment, the light emitting points 302a to 302h are arrayed linearly along the first straight line K1, but need not necessarily be linearly arrayed.

The plurality of light beams emitted from the light source 302 pass through the inside of the triangle formed by the first abutment portion 1m, the second abutment portion 1j, and the third abutment portion 1k. The three abutment portions 1m, 1j, and 1k are in abutment with the package portion 353 of the light source 302.

A reference surface 302j of the light source 302 is provided on the package portion 353 so as to be parallel to a plane of the portion 354 in which the eight light emitting points 302a to 302h are provided.

As illustrated in FIG. 4B, the first abutment portion 1m, the second abutment portion 1j, and the third abutment portion 1k are in abutment with edge portions of the light source 302. The first abutment portion 1m and the third abutment portion 1k are in abutment with both end portions (both apexes) 302na and 302nb of one side (edge portion) 302n, which has the length L1, of the light source 302, respectively. On other side (edge portion) 302m opposed to the one side (edge portion) 302n, the second abutment portion 1j is in abutment with the other side 302m at the position Pj between a central portion of the other side 302m and the first straight line K1. The position Pj is away from an end portion 302ma of the other side 302m by the distance L4, the end portion 302ma being on the side of the diagonal line DL closer to the first straight line K1. The distance L4 is smaller than half of the length L1 of each of the short sides (L4<L1/2).

The angle β1 is formed by the first straight line K1 connecting the two light emitting points 302a and 302h, which are farthest from each other in the light source 302 held by the laser holder 1, with the second straight line K2 connecting the first abutment portion 1m with the second abutment portion 1j. The angle β2 is formed by the first straight line K1 with the third straight line K3 connecting the second abutment portion 1j with the third abutment portion 1k. The angle β3 is formed by the first straight line K1 with the fourth straight line K4 connecting the third abutment portion 1k with the first abutment portion 1m. When the laser holder 1 and the light source 302 held by the laser holder 1 are viewed along an optical path of the plurality of light beams emitted from the light source 302 held by the laser holder 1, the angle β1 is smaller than each of the angle β2 and the angle β3 (β1<β2 and β1<β3). The second straight line K2 may be parallel to the first straight line K1.

The distance D1 between the first abutment portion 1m and the second abutment portion 1j is larger than the distance D2 between the second abutment portion 1j and the third abutment portion 1k (D1>D2). The distance D1 is larger than the distance D3 between the third abutment portion 1k and the first abutment portion 1m (D1>D3).

By the way, the first abutment portion 1m and the second abutment portion 1j which are farthest from each other of the three abutment portions 1j, 1k, and 1m in the direction along the first straight line K1 are separated from each other by the distance L2. The distance L2 corresponds to the distance between the center of the second abutment portion 1j and the center of the first abutment portion 1m in the direction along the first straight line K1. The two abutment portions 1k and 1j which are farthest from each other of the three abutment portions 1j, 1k, and 1m in the direction perpendicular to the first straight line K1 are separated from each other by the distance L3. The distance L3 corresponds to the distance between the center of the abutment portion 1k and the center of the abutment portion 1j in the direction perpendicular to the first straight line K1. The distance L2 is larger than the distance L3 (A relationship of L2>L3 is satisfied.).

The three abutment portions 1j, 1k, and 1m are provided on the laser holder 1 in a manner that the center of gravity G of the package portion 353 of the light source 302 is located within the triangle formed by the three abutment portions 1j, 1k, and 1m. With this, the laser holder 1 can stably hold the light source 302.

The difference in height between the abutment portion 1j and the abutment portion 1m directly influences the perpendicularity of the first straight line K1 of the light emitting points 302a to 302h with respect to the optical axis OA. Thus, when the difference in height between the first abutment portion 1m and the second abutment portion 1j is equal to or less than a predetermined value, the position of the light source 302 in the focus direction can be secured with high accuracy. As a result, without limiting the difference in height between the abutment portions 1k and 1j and the difference in height between the abutment portions 1k and 1m to small values more than is necessary, the light source 302 can be mounted to the laser holder 1 while maintaining the position of the light source 302 in the focus direction with high accuracy.

With such a simple structure, the accuracy which is required at the time of setting the heights of the three abutment portions 1j, 1k, and 1m can be reduced. Thus, errors of focal positions between the plurality of light beams emitted from the plurality of light emitting points 302a to 302h can be reduced. Further, the light emitting points 302a to 302h are arrayed substantially along the diagonal line DL of the package portion 353 of the light source 302. Thus, the distance L2 between the abutment portion 1j and the abutment portion 1m in the direction along the first straight line K1 can be increased. Therefore, tolerance of the difference in height between the abutment portion 1j and the abutment portion 1m, which is required for regulating the perpendicularity of the first straight line K1 of the light emitting points 302a to 302h with respect to the optical axis OA, can be increased.

Further, also in this embodiment, the main scanning magnification of the light scanning apparatus 50a is set to be higher than the sub-scanning magnification. Thus, the errors of focal positions on the photosensitive drum 82a occur on a larger scale in the main scanning direction than in the sub-scanning direction. The first straight line K1 of the light emitting points 302a to 302h of the light source 302 extends substantially along the main scanning direction MS of a higher magnification, and hence the distances among the abutment portions 1j, 1k, and 1m in the direction along the first straight line K1 of the light emitting points 302a to 302h are important. In view of this, the distance L2 between the first abutment portion 1m and the second abutment portion 1j which are farthest from each other in the direction along the first straight line K1 is set to be larger than the distance L3 between the abutment portions 1j and 1k which are farthest from each other in the direction perpendicular to the first straight line K1. That is, the relationship of L2>L3 is satisfied. Thus, at the time of setting the reference surface 302j of the light source 302 perpendicularly to the optical axis OA, the tolerance of the accuracy can be increased in the main scanning direction MS in which the errors of focal positions occur on a larger scale. Therefore, the errors of focal positions can be reduced.

As described above, the light source 302 including the rectangular package portion 353 according the third embodiment also provides the same advantages and functions as those in the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-173563, filed Aug. 23, 2013, which is hereby incorporated by reference herein in its entirety.

What is claimed is:

1. A light beam emitting apparatus, comprising:
    a light source including a plurality of light emitting points configured to emit a plurality of light beams; and
    a holding member configured to hold the light source, the holding member including: a first abutment portion; a second abutment portion; and a third abutment portion, an emission direction of the plurality of light beams to be emitted from the plurality of light emitting points being regulated by the first abutment portion, the second abutment portion, and the third abutment portion being in abutment with the light source,
    wherein the first abutment portion, the second abutment portion, and the third abutment portion are in abutment with the light source so that, when the holding member and the light source held by the holding member are viewed along an optical path of the plurality of light beams emitted from the light source held by the holding member, an angle, which is less than or equal to 90°, of supplementary angles formed by a first straight line connecting two light emitting points farthest from each other of the plurality of light emitting points of the light source held by the holding member with a second straight line connecting the first abutment portion with the second abutment portion is smaller than each of an angle, which is less than or equal to 90°, of supplementary angles formed by the first straight line with a third straight line connecting the second abutment portion with the third abutment portion and an angle, which is less than or equal to 90°, of supplementary angles formed by the first straight line with a fourth straight line connecting the third abutment portion with the first abutment portion, and a distance between the first abutment portion and the second abutment portion is larger than each of a distance between the second abutment portion and the third abutment portion and a distance between the third abutment portion and the first abutment portion.

2. A light beam emitting apparatus according to claim 1, wherein the light source comprises:
    a portion on which the plurality of light emitting points are formed; and
    a package portion surrounding the portion, and
    wherein the first abutment portion, the second abutment portion, and the third abutment portion are in abutment with the package portion of the light source.

3. A light beam emitting apparatus according to claim 2, wherein the package portion has a quadrangular shape.

4. A light beam emitting apparatus according to claim 3, wherein the two light emitting points farthest from each other are arranged on one of diagonal lines of the package portion having the quadrangular shape.

5. A light beam emitting apparatus according to claim 3, wherein two of the first abutment portion, the second abutment portion, and the third abutment portion are in abutment with both apexes of one side of the quadrangular shape, and a remaining one of the first abutment portion, the second abutment portion, and the third abutment portion is in abutment with other side, which is opposed to the one side, at a position between the first straight line and a central portion of the other side of the quadrangular shape.

6. A light beam emitting apparatus according to claim 1, wherein the plurality of light beams emitted from the light source pass through an inside of a triangle formed by the first abutment portion, the second abutment portion, and the third abutment portion.

7. A light beam emitting apparatus according to claim 1, further comprising a substrate on which the light source is mounted,
    wherein the substrate is fixed to the holding member at least at three positions, and
    wherein, as viewed from a traveling direction of the plurality of light beams emitted from the light source fixed to the holding member, a center of gravity of a triangle formed by three fixation positions closer to the light source than other fixation position of the at least three fixation positions is located within a triangle formed by the first abutment portion, the second abutment portion, and the third abutment portion.

8. A light scanning apparatus, comprising:
    beam emitting apparatus as recited in claim 1;
    a deflecting member configured to deflect the plurality of light beams emitted from the light beam emitting apparatus; and
    an imaging optics configured to image the plurality of light beams deflected by the deflecting member on a surface of a photosensitive member.

9. A light scanning apparatus according to claim 8, wherein a number of light emitting points of the plurality of light emitting points to be arrayed in a direction of a higher magnification of a magnification in a main scanning direction of the light scanning apparatus and a magnification in a sub-scanning direction of the light scanning apparatus is larger than a number of light emitting points of the plurality of light emitting points to be arrayed in a direction of a lower magnification of the magnification in the main scanning direction of the light scanning apparatus and the magnification in the sub-scanning direction of the light scanning apparatus.

10. An image forming apparatus configured to form an image on a recording medium, the image forming apparatus comprising:
    a photosensitive member;

a charging device configured to uniformly charge a surface of the photosensitive member; and
a light scanning apparatus as recited in claim 8, configured to irradiate the plurality of light beams to a uniformly charged surface of the photosensitive member to form an electrostatic latent image.

\* \* \* \* \*